United States Patent Office 3,453,264
Patented July 1, 1969

---

3,453,264
α-PHTHALIMIDOBENZYLPENICILLINS
George Robert Fosker, Horsham, and John Herbert Charles Nayler, Dorking, England, assignors to Beecham Group Limited, Brentford, England, a British company
No Drawing. Filed July 27, 1965, Ser. No. 475,246
Claims priority, application Great Britain, July 29, 1964, 30,092/64
Int. Cl. C07d 99/22; A61k 21/00
U.S. Cl. 260—239.1          6 Claims

ABSTRACT OF THE DISCLOSURE

Derivatives of 6-aminopenicillanic acid useful as antibacterial agents are disclosed, being penicillins wherein the side chain contains an α-N,N-disubstituted amino group. They may also be used as nutritional supplements in animal food, as agents for the treatment of mastitis in cattle and as therapeutic agents in poultry and animals.

---

This invention relates to new penicillins and is particularly concerned with a new class of penicillins which are derivatives of 6-aminopenicillanic acid and which are of value as antibacterial agents, as nutritional supplements in animal food, as agents for the treatment of mastitis in cattle and as therapeutic agents in poultry and animals, including man, in the treatment especially of infectious diseases caused by Gram-positive and Gram-negative bacteria.

According to the present invention there is provided new penicillins of the general formula:

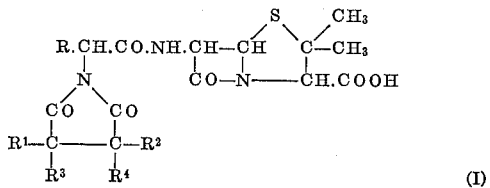

and non-toxic salt sthereof, wherae R is an alkyl, aralkyl, aryl or heterocyclic group which may be substituted, $R^1$ and $R^2$ are the same or different and each is a hydrogen atom or a lower alkyl group, or together represent an additional bond joining the carbon atoms to which they are attached, and $R^3$ and $R^4$ are the same or different and each is a hydrogen or halogen atom or a hydroxy, lower alkyl, lower alkoxy or lower acyloxy group, or together with the two carbon atoms to which they are attached comprise a carbocyclic or heterocyclic ring which may be substituted.

The term "lower" as used herein refers to radicals containing not more than six carbon atoms.

The salts are non-toxic salts including non-toxic metallic salts such as sodium, potassium, calcium and aluminium, ammonium and substituted ammonium salts, e.g. salts of such non-toxic amines as trialkylamines, including triethylamine, procaine, dibenzylamine, N-benzyl-beta-phenethylamine, 1-ephenamine, N,N'-dibenzylethylenediamine, dehydroabietylamine, N,N' - bis-dehydroabietylethylenediamine, and other amines which have been used to form salts with benzylpenicillin.

The present invention further provides a process for the preparation of new penicillins having the general Formula I in which 6-aminopenicillanic acid or a salt thereof is coupled with an acid of the general formula:

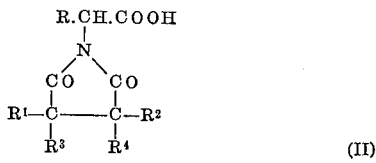

where R, $R^1$, $R^2$, $R^3$ and $R^4$ are as hereinbefore defined.

The coupling of the 6-aminopenicillanic acid and the appropriate carboxylic acid may be effected by the use of the acid chloride or its functional equivalent as an acylating agent for a primary amino group. Such equivalents include the corresponding carboxylic acid bromides, azides, acid anhydrides and mixed anhydrides with other carboxylic acids, including monoesters and particularly lower aliphatic esters, of carbonic acid.

Alternatively, the 6-aminopenicillanic acid may be reacted with the intermediates formed from the acid (II) and a condensing agent such as dicyclohexylcarbodiimide or carbonyldiimidazole.

In a yet further process for preparing some of the penicillins of the present invention the starting material is the corresponding α-aminopenicillin:

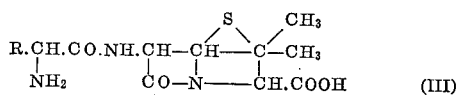

wherein R has the above meansing.

Thus, a preferred penicillin of the present invention, α-phthalimidobenzylpenicillin, may be prepared by reacting α-aminobenzylpenicillin with N-ethoxycarbonylphthalimide.

A particular class of compounds of general Formula I is that in which the side-chain contains a primary amino group. Typical examples are α-phthalimido m aminobenzylpenicillin and α(3-aminophthalimido)benzylpenicillin. Such compounds are conveniently prepared by first synthesizing the corresponding structures containing a nitro group or a benzylcarbonylamino group by any of the methods outlined above, and thereafter converting the nitro or benzyloxycarbonylamino group into the amino group by catalytic hydrogenation.

The novel penicillins of the present invention are each capable of existing in two epimeric forms and it is to be understood that the invention includes both the D- and L-forms as well as the DL-mixture.

The following examples illustrate the invention:

EXAMPLE 1

Sodium 6-(DL-α-phthalimidophenylacetamido) penicillanate

A solution of DL-α-phthalimidophenylcetyl chloride (5 g.) in acetone (100 ml.) was added dropwise over 30 minutes to a stirred solution of 6-aminopenicillanic acid (4.3 g.) in 3% aqueous sodium bicarbonate (140 ml.) and acetone (40 ml.). The mixture was stirred at room temperature for 1 hour more and then extracted with ether (450 ml. in 3 portions), only the aqueous phase being retained. The latter was covered with a further 100 ml. of ether, and adjusted to pH 2 by addition of dilute hydrochloric acid. The layers were separated and the aqueous phase was extracted at pH 2 with more ether 2× 75 ml.). The combined ether extracts, containing the penicillin in the free acid form, were then re-extracted with just enough 3% aqueous sodium bicarbonate to give an aqueous phase of pH 7. Evaporation of the neutral aqueous solution at low temperature and pressure left the crude sodium salt of the penicillin, which was finally dried over phosphorus pentoxide in vacuo.

The product was estimated by manometric assay with penicillinase to be about 76% pure. When subjected to paper chromatography it gave a single zone of antibacterial activity.

EXAMPLE 2

Sodium 6-(D-α-phthalimidophenylacetamido) penicillanate

A solution of N-ethoxycarbonylphthalimide (5.6 g.) in acetone (25 ml.) was added slowly with stirring to a solution of 6[D(-)α-aminophenylacetamido]penicillanic acid trihydrate (8 g.) and anhydrous sodium carbonate (2.2 g.) in water (30 ml.). When addition was complete the mixture was stirred at room temperature for 1 hour more and then extracted with ether (150 ml. in three portions), only the aqueous phase being retained. The latter was covered with methyl isobutyl ketone (50 ml.) and adjusted to pH 2 by addition of dilute hydrochloric acid. The layers were separated and the aqueous phase was extracted at pH 2 with a further 15 ml. of methyl isobutyl ketone.

The combined solvent extracts, containing the penicillin in the free acid form, were washed with saturated brine and then clarified by filtration. A 2 N solution of sodium 2-ethylhexoate in methyl isobutyl ketone (9 ml.) was added to precipitate the sodium salt of the penicillin, which was collected and washed first with methyl isobutyl ketone and then with ether. After drying over phosphorus pentoxide in vacuo the yield was 7.6 g. and manometric assay with penicillinase indicated a purity of about 63%. When subjected to paper chromatography the product gave a single zone of antibacterial activity having the same $R_F$ value as the DL-compound described in Example 1.

EXAMPLE 3

Sodium 6-(L-α-phthalimidopropionamido) penicillanate

L-α-phthalimidopropionic acid (4.4 g.) was heated with an excess of thionyl chloride under reflux for 1 hour. Volatile matter was removed under reduced pressure, finally by co-distillation with dry benzene, and the residual oily acid chloride was dissolved in methyl isobutyl ketone (25 ml.). This solution was added gradually with vigorous stirring to a solution prepared from 6-aminopenicillanic acid (4.3 g.), water (50 ml.) and triethylamine (2.8 ml.). When addition was complete, the mixture was stirred at room temperature for 1 hour more, after which the pH of the aqueous layer was adjusted (if necessary) to between 1 and 2. The layers were separated and the organic phase was washed with water (2× 25 ml.) and then with saturated brine (25 ml.). The clear organic phase was then treated with a 2 N solution of sodium 2-ethylhexoate in methyl isobutyl ketone (6 ml.). The resulting white precipitate was collected, washed with methyl isobutyl ketone followed by dry ether, and finally dried in vacuo over phosphorus pentoxide to yield the sodium salt of the penicillin (4.5 g.).

The product was estimated by manometric assay with penicillinase to be about 65% pure. When subjected to paper chromatography it gave a single zone of antibacterial activity.

EXAMPLE 4

Sodium 6-(DL-α-phthalimido n valeramido) penicillanate

DL-α-phthalimido n valeric acid (4.95 g.) was converted into its acid chloride and then allowed to react with 6-aminopenicillanic acid by the procedure of Example 3 to yield 7.4 g. of the crude sodium salt of the penicillin. Manometric assay indicated the product to be about 69% pure and paper chromatography revealed a single zone of antibacterial activity.

EXAMPLE 5

Sodium 6-(DL-α-phthalimido-γ-methylthiobutyramido) penicillanate

DL-α-phthalimido-γ-methylthiobutyric acid (5.6 g.) was converted into its acid chloride and then allowed to react with 6-aminopenicillanic acid by the procedure of Example 3 to yield 5.1 g. of the crude sodium salt of the penicillin. Manometric assay indicated the product to be about 68% pure, and paper chromatography revealed a single zone of antibacterial activity.

EXAMPLE 6

Sodium 6-[DL-α-(3-nitrophthalamido)phenylacetamido]penicillanate

A suspension of DL-α-aminophenylacetic acid (18.9 g.) and 3-nitrophthalic anhydride (24.1 g.) in dry toluene (400 ml.) was treated with triethylamine (1.4 ml.) and heated under reflux with azeotropic removal of water. When the theoretical quantity of water (2.25 ml.) had been collected, the mixture was cooled and filtered. Recrystallisation of the solid from ethanol gave pale yellow crystals of DL-α-(3-nitrophthalimido)phenylacetic acid (23.1 g.), M.P. 230–235°. (Found: C, 58.8; H, 3.2; N, 8.7. $C_{16}H_{10}N_2O_6$ requires C, 58.9; H, 3.1; N, 8.6%.)

The above acid (6.5 g.) and thionyl chloride (15 ml.) were heated at 60–65° for 3 hours and then freed from volatile material under reduced pressure, finaly by co-distillation with dry chloroform, to leave DL-α-(3-nitrophthalamido)phenylacetylchloride (6.5 g.), M.P. 118–124°. (Found: C, 55.6; H. 3.0; Cl, 10.4; N, 8.4. $C_{16}H_9ClN_2O_5$ requires C, 55.6; H, 2.9; Cl, 10.3; N, 8.1%.)

This acid chloride (6.9 g.) was allowed to react with 6-aminopenicillanic acid (4.3 g.) by the procedure of Example 3 to give 7.8 g. of crude sodium 6-[DL-α-(3-nitrophthalamido)phenylacetamido]penicillanate. Manometric assay indicated the product to be about 65% pure, and paper chromatography revealed a single zone of antibacterial activity.

EXAMPLE 7

Sodium 6-[DL-α-(3-aminophthalimido)phenylacetamido]-penicillanate

The product from Example 6 (1 g.) was dissolved in water (20 ml.) to give a pale yellow solution. This was aded to an aqueous suspension (30 ml.) of 5% palladium-calcium carbonate catalyst (5 g.) which had previously been shaken under hydrogen for 1 hour. The mixture was hydrogenated at room temperature and pressure for 90 minutes and then filtered. The combined filtrate and aqueous washings, now deep yellow in colour, were evaporated at low temperature and pressure. The residual yellow solid was finally dried over phosphorus pentoxide in vacuo to yield the crude aminopenicillin (0.71 g.), which on paper chromatography showed a single zone of antibacterial activity. Comparison of its infra red absorption spectrum with that of the unreduced starting material showed that the band at 1540 cm.$^{-1}$ (characteristic of the nitro group) had disappeared.

EXAMPLE 8

Sodium 6-(DL-α-phthalimido-m nitrophenylacetamido)penicillanate

A mixture of DL-α-amino-m nitrophenylacetic acid (19.9 g.), phthalic anhydride (14.8 g.), and triethylamine (1.4 ml.) was heated in dry benzene (120 ml.) with azeotropic removal of water to give DL-α-phthalimido-m nitrophenylacetic acid (6.4 g.), M.P. 170–173°. (Found: C, 58.6; H, 3.1; N, 8.6. $C_{16}H_{10}N_2O_6$ requires C, 58.9; H, 3.1; N, 8.6%.)

The above acid (4.35 g.) was heated with thionyl chloride at 60° for 5 hours to give, after removal of excess reagent in vacuo, DL-α-phthalimido-m nitrophenylacetyl chloride (4.0 g.), M.P. 118–136°. (Found: C, 56.9; H, 3.0; Cl, 10.2; N, 8.2. $C_{16}H_9ClN_2O_5$ requires C, 55.6; H, 2.9; Cl, 10.3; N, 8.1%.)

This acid chloride (3.45 g.) was allowed to react with 6-aminopenicillanic acid (2.15 g.) by the procedure of Example 3 to give 2.5 g. of crude sodium 6-(DL-α-phthalimido-m nitrophenylacetamido)penicillanate, which gave a single zone of antibacterial activity on a paper chromatogram.

EXAMPLE 9

Sodium 6-(DL-α-phthalimido-m aminophenylacetamido) penicillanate

The product from Example 8 (0.75 g.) was dissolved in water (20 ml.) and the resulting yellow solution was hydrogenated over 5 g. of catalyst by the procedure of Example 7, but this time at the end of the reduction the filtrate and washings were colourless. The amino penicillin, obtained by evaporation in vacuo, weighed 0.55 g. and gave a single zone of antibacterial activity on a paper chromatogram. Comparison of its infra red absorption spectrum with that of the unreduced starting material showed that the characteristic band of the nitro group at 1540 cm.$^{-1}$ had disappeared.

EXAMPLE 10

Sodium 6-(DL-α-succinimidophenylacetamido) penicillanate (a) DL-α-succinimidophenylacetic acid (4.5 g.) was heated under reflux with thionyl chloride (25 ml.) for 1 hour. Volatile material was removed in vacuo, finally by codistillation with dry chloroform, to leave DL-α-succinimidophenylacetyl chloride (4.5 g.) M.P. 117–120°.

This acid chloride (2.5 g.) was allowed to react with 6-aminopenicilanic acid (2.15 g.) by the procedure of Example 3 to give crude sodium 6-(DL-α-succinimidophenylacetamido)penicillanate (5.4 g.), which gave a single zone of antibacterial activity on a paper chromatogram.

(b) The same penicillin was obtained by treating α-aminobenzylpenicillin with N-ethoxycarbonyl succinimide by the procedure of Example 2.

(c) A less pure form of the penicillin was also obtained by the action of succinyl chloride on the triethylamine salt of α-aminobenzylpenicillin in methylene chloride at about −20° C.

EXAMPLE 11

Sodium 6-[DL-α-(pyrazine-2,3-dicarboximido) phenylacetamido]penicillanate

Treatment of DL-α-aminophenylacetic acid with pyrazine-2,3-carboxyanhydride under Schotten-Baumann conditions gave DL-α(3-carboxypyrazine-2-carbamido) phenylacetic acid. This acid (4.4 g.) and anhydrous sodium acetate (3.85 g.) in glacial acetic acid (20 ml.) were heated under reflux for 3 hours, then the solvent was removed under reduced pressure. The residue was dissolved in water and acidified with concentrated hydrochloric acid. The crystalline precipitate was collected and recrystallised from hot aqueous acetone to give DL-α-(pyrazine-2,3-dicarboximido)phenylacetic acid (1.45 g.), M.P. 215–218°. (Found: N, 14.7. $C_{14}H_9N_3O_4$ requires N, 14.8%.)

The above acid (1.4 g.) was converted into the corresponding acid chloride, which in turn was allowed to react with 6-aminopenicillanic acid (0.7 g.) by the procedure of Example 3. The resulting crude penicillin salt (0.31 g.) gave a single zone of antibacterial activity on a paper chromatogram.

EXAMPLE 12

Sodium 6-(α-phthalimido-3-thienylacetamido) penicillanate

This penicillin was prepared by treating 6[(-)α-amino-3-thienylacetamido]penicillanic acid with N-ethoxycarbonyl phthalimide by the general procedure of Example 2.

We claim:

1. A member selected from the group consisting of an acid of the formula:

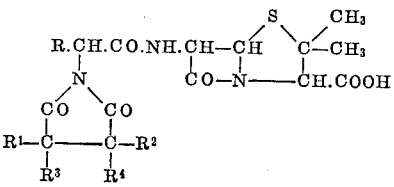

where R is lower alkyl or lower alkyl-thio-lower alkyl, benzyl, phenyl, nitrophenyl, aminophenyl or thienyl, $R^1$, $R^2$, $R^3$ and $R^4$ are each hydrogen or together with the two carbon atoms to which they are attached are phenyl, nitrophenyl or aminophenyl or the pyrazine ring, and its sodium, potassium, calcium, aluminium and ammonium salts and its non-toxic substituted ammonium salts with amines selected from the group consisting of tri-lower-alkylamines, procaine, dibenzylamine, N-benzyl-betaphenethylamine, 1-ephenamine, N,N′-dibenzylethylenediamine, dehydroabiethylamine, N,N′-bis-dehydroabietylethylenediamine and N-lower-alkylpiperidines.

2. 6-(DL-α-phthalimidophenylacetamido)penicillanic acid.

3. 6-(D-α-phthalimidophenylacetamido)penicillanic acid.

4. 6-[DL-α-(3-nitrophthalimido)phenylacetamido] penicillanic acid.

5. 6-(DL-α-succinimidophenylacetamido)penicillanic acid.

6. α-phthalimidobenzylpenicillin.

References Cited

UNITED STATES PATENTS 3,311,609   3/1967   Cheney et al. _____ 260—239.1

NICHOLAS S. RIZZO, *Primary Examiner.*

U.S. Cl. X.R.

424—271